FREQUENCY CONTROL SYSTEM FOR MAGNETRON OSCILLATORS

Filed Jan. 14, 1950

Inventor:
Philip H. Peters, Jr,
by Paul A. Frank
His Attorney.

Patented June 15, 1954

2,681,413

UNITED STATES PATENT OFFICE 2,681,413

FREQUENCY CONTROL SYSTEM FOR MAGNETRON OSCILLATORS

Philip H. Peters, Jr., Schenectady, N. Y., assignor, by mesne assignments, to the United States of America as represented by the Secretary of the Army Application January 14, 1950, Serial No. 138,631

2 Claims. (Cl. 250—36)

My invention relates to the frequency control of magnetron oscillators and, more particularly, to the stabilization of the frequency of magnetron oscillators by controlling the anode to cathode potential of the reactance section of a magnetron.

A magnetron is an electronic oscillator capable of producing high power oscillations over a large portion of the high frequency spectrum at a high efficiency. As is the case with power oscillators, however, the frequency is subject to variations in tube and circuit parameters such, for example, as load. Consequently, if some means for stabilizing a magnetron is not employed, its output frequency will drift.

It is, therefore, an object of my invention to provide an improved circuit arrangement to accurately control the output frequency of a magnetron electronically.

An adjustable direct voltage across the anode-to-cathode of the reactance section of a magnetron oscillator may be used to control the frequency of oscillation of the magnetron. Stability is, therefore, accomplished by comparing the frequency of the magnetron with one or more other frequencies to produce a direct voltage whose magnitude is proportional to the frequency drift of the magnetron. The comparison is attained in a conventional frequency detector circuit, which in the art is called a discriminator circuit, and the direct voltage output of the discriminator is amplified and used to control the frequency of the magnetron.

There are many methods for deriving a direct voltage proportional to the frequency drift of an oscillator. Very briefly, I will describe two of these methods in which my invention finds utility. The simplest of the two methods is one in which the resonant frequency of the discriminator is tuned to the frequency at which the magnetron is desired to oscillate. A portion of the magnetron output is supplied directly to the discriminator whereby the output from the discriminator is a direct voltage proportional to the difference between the magnetron frequency and the resonant frequency of the discriminator. Because magnetrons are often operated at frequencies of approximately 1,000 megacycles, the application of this method of stabilization at such a high frequency is very difficult. The second and following method is, therefore, preferable for controlling magnetrons operating at very high frequencies.

In this method a portion of the magnetron output is mixed with a signal from a stable, low power, local oscillator to produce a signal whose frequency is considerably less than, but dependent upon, the magnetron frequency. This reduced frequency signal, which in the art is called an intermediate frequency signal, is then amplified and supplied to the discriminator; the remainder of the circuit operates like the circuit of method 1. Because the intermediate frequency is lower than the magnetron frequency by an amount equal to the frequency of the local oscillator, the difficulty of operating a discriminator circuit at very high frequencies is obviated. Also, because of the reduction of the frequency of the input signal to the control circuit, the sensitivity of the controlling circuit is greatly increased and the magnetron frequency may be held within much closer limits.

For additional objects and advantages, and for a better understanding of the invention, attention is now directed to the following description and accompanying drawing, and also to the appended claims in which the features of the invention believed to be novel are particularly pointed out.

Figure 1:
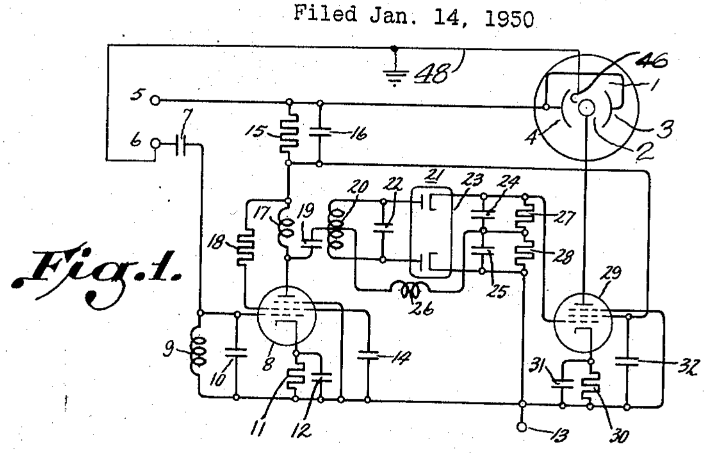
Fig. 1 is a schematic electric diagram of my invention.

Referring to Fig. 1, there is shown a reactance section 1 of a magnetron whose frequency of oscillation is to be stabilized. This reactance section is shown as a split anode type magnetron having a cathode 2 and a plurality of anodes 3 and 4 electrically connected together and grounded. As will be shown later, the anode-to-cathode voltage which is of the order of hundreds of volts is obtained by supplying a controlled negative voltage to the cathode of reactance section 1 while the anodes are held at ground potential.

A frequency dependent upon the output frequency of the magnetron is applied across terminals 5 and 6 and coupled through a capacitor 7 to the control grid of an electronic valve 8. The output energy from the magnetron may be fed to terminals 5 and 6 by means of coupling loop 46 and feed line 48 which may comprise a coaxial cable or any other suitable high-frequency transmission line well known in the art. In the grid circuit of tube 8 are an inductor 9 and a capacitor 10 connected in parallel to form a parallel resonant circuit. The cathode of tube 8 is coupled through a parallel arrangement of a cathode resistor 11 and a by pass capacitor 12 to the direct supply voltage, which is applied at a terminal 13 and connected through a capacitor 14 to the screen grid of valve 8. A suppressor grid of tube 8 is directly connected to terminal 13. A parallel circuit comprising resistor 15 and capacitor 16 is interconnected between ground and one tap of an inductor 17, another tap of inductor 17 being connected to the anode of tube 8. The junction of capacitor 16 and inductor 17 is connected through a resistor 18 to the screen grid of tube 8. The anode of tube 8 is connected through a capacitor 19 to a tap of an inductor 20. This inductor is part of a conventional frequency detector circuit 21 or as it is called in the art, discriminator circuit. Inductor 20 in parallel with a capacitor 22 forms the resonant circuit of discriminator 21, and the output of this resonant circuit is fed to the plates of a double diode tube 23. This resonant circuit is tuned to the frequency which is used as the standard to which the magnetron output frequency is compared. The plates of the double diode tube 23 are connected to different terminals of capacitor 22 and a pair of capacitors 24 and 25 are connected in series between the cathodes of tube 23. The junction of capacitor 24 and capacitor 25 is connected through a radio frequency choke coil 26 to the previously cited tap on inductor 20. A pair of resistors 27 and 28 are connected in series between the cathodes of tube 23 and the junction of these resistors is connected to the junction of capacitor 24 and capacitor 25. One of the cathodes of tube 23 is directly connected to the direct voltage supply and the other cathode is connected to the control grid of a tube 29. This tube and its associated circuit elements is a conventional direct voltage amplifier. The cathode of tube 29 is connected through a cathode resistor 30 to the direct voltage supply and a capacitor 31 parallels resistor 30. The suppressor grid of tube 29 is connected to the direct voltage supply through a capacitor 32, and this grid is also directly connected to the junction of capacitor 16 and inductor 17. The screen grid of tube 29 is directly connected to the direct voltage supply, and the anode of tube 29 is directly connected to cathode 2 of magnetron reactance section 1.

In normal operation the portion of the magnetron output signal which is fed to the control electrode of tube 8 is amplified by this tube and the amplified output signal is fed from the anode of tube 8 to inductor 17. This signal is then coupled both inductively from inductor 17 to inductor 20 and capacitively by capacitor 19 to the resonant circuit comprising inductor 20 and capacitor 22. The output of discriminator circuit 21, which appears between the two cathodes of double diode 23, is a direct voltage which is proportional to the difference between the frequency output of tube 8 and the resonant frequency of inductor 20 and capacitor 22. Capacitors 24 and 25 prevent any radio frequency from appearing in the output of the discriminator. The direct voltage output of tube 23 is then directly connected to the control grid of tube 29 where it is amplified and the amplified voltage appears at cathode 2 of reactance section 1.

Figures 2, 3:
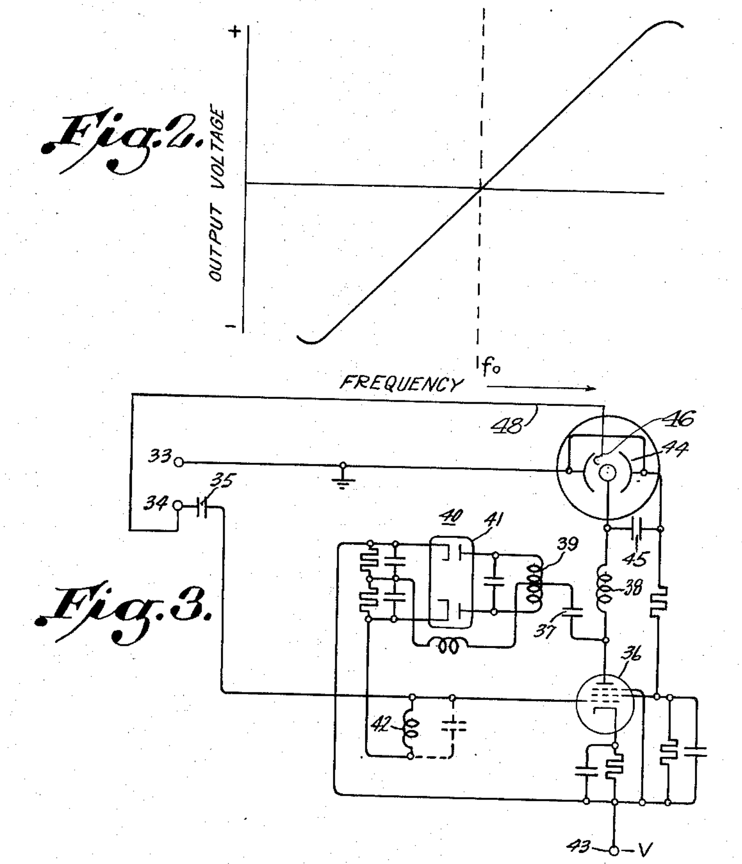
Fig. 2 is a curve showing the relationship between the output voltage of the discriminator circuit and the difference in the two frequencies compared.
Fig. 3 is a schematic electric diagram of a preferred form of my invention.

The output of the discriminator section versus the difference in frequency between that applied at terminal 6 and the frequency of the discriminator resonant circuit is shown in Fig. 2. As the frequency of the magnetron goes above $f_0$, which is the desired operating frequency of the magnetron or a frequency proportional thereto, a greater positive voltage appears on the control grid of tube 29 which reduces the magnetron output frequency, and if the output frequency of the magnetron is below that desired, the direct voltage on the control grid 29 is negative, and the magnetron output frequency is increased. This frequency correction occurs because an increase in anode-to-cathode voltage of the reactance section produces a corresponding decrease in the output frequency of the magnetron oscillator. The direct voltage supply necessary to operate this circuit and which is applied to terminal 13, is negative and may be of the order of 1,000 volts.

Referring to Fig. 3 there is shown a preferred form of my invention which eliminates the use of one tube and thus cuts the required operating power in half. Combining of the radio frequency power amplifier and the direct power amplifier in this circuit is possible because both tubes operate class A and both also operate at approximately the same power level.

In this preferred circuit the radio frequency output of the magnetron oscillator or a signal whose frequency is dependent thereon is fed in across terminals 33 and 34 by means of coupling loop 46 and feed line 48, through a capacitor 35 to the control grid of a pentode 36. This radio frequency signal is amplified by tube 36 and capacitively coupled through a capacitor 37 and inductively coupled from coil 38 to coil 39 to a conventional discriminator circuit 40. The direct voltage output of discriminator 40 appears between the cathodes of a double diode tube 41 in which one cathode is connected through a radio frequency choke coil 42 to the control grid of tube 36 and the other cathode of which is directly connected to a negative direct voltage source which is fed in at a terminal 43. The direct voltage output of the discriminator and the radio frequency signal from the magnetron are thus superimposed at the control grid of tube 36. The direct voltage output of the discriminator is thus amplified by tube 36, and the amplified voltage is supplied to reactance section 44 to control the output frequency of the magnetron. A capacitor 45 prevents the radio frequency signal from appearing between the anodes and the cathode of reactance section 44 and, consequently, interfering with the operation of the magnetron. Radio frequency choke coil 42 which for high frequencies is effectively connected between the control grid and the cathode of tube 36, is necessary to provide an impedance across which the input signal may build up that voltage which appears on the control grid of tube 36.

While certain specific embodiments have been shown and described, it will, of course, be understood that various modifications may be made without departing from the invention. The appended claims are, therefore, intended to cover any such modifications as lies within the true spirit and scope of the invention.

What I claim as new and desire to secure by Letters Patent of the United States is:

1. In a frequency stabilizing system for an oscillatory magnetron generator having a reactance section including a cathode and at least two anodes in which a variation of the applied voltage between the cathode and anodes produces a change in the magnetron output frequency, means for varying the applied voltage between said cathode and anodes in response to changes in the magnetron output frequency comprising a combined radio frequency and direct current amplifier having an input circuit and an output circuit, means for supplying a radio frequency voltage having a frequency dependent upon said magnetron output frequency to said amplifier input circuit, a frequency discriminator circuit for producing a unidirectional output voltage dependent upon the frequency of the signal supplied to it, means coupling said amplifier output circuit to said discriminator circuit to supply amplified radio frequency signals thereto, means for supplying unidirectional output voltages from said discriminator to said amplifier input circuit, and means for supplying amplified unidirectional voltages from said amplifier output circuit to said magnetron reactance section.

2. In combination, a magnetron reactance section having a cathode and at least two anodes, said section adapted to be coupled to an oscillatory magnetron so that variation of an applied voltage between said cathode and said anodes produces a change in the magnetron output frequency, and means for applying a voltage between said cathode and anodes varying in response to variations in said magnetron output frequency comprising a discharge device for amplifying both direct current and ratio frequency signals, said device having an input circuit and an output circuit, capacitive means for supplying a radio frequency signal having a frequency dependent upon said magnetron output frequency to said amplifier input circuit, a frequency discriminator circuit for producing a unidirectional output voltage having an amplitude corresponding to the frequency of a radio frequency signal applied thereto, capacitive means coupling said amplifier output circuit to said discriminator for supplying amplified radio frequency signals thereto, means connecting said discriminator output circuit to said amplifier input circuit for supplying unidirectional output voltages thereto, and means including a radio frequency choke for coupling said amplifier output circuit to said reactance section.

References Cited in the file of this patent

UNITED STATES PATENTS

| Number | Name | Date |
|---|---|---|
| 1,912,752 | Bethenod | June 6, 1933 |
| 2,233,198 | Dome | Feb. 25, 1941 |
| 2,395,770 | Vilkomerson | Feb. 26, 1946 |
| 2,406,125 | Ziegler et al. | Aug. 20, 1946 |
| 2,468,029 | Bruck | Apr. 26, 1949 |
| 2,564,005 | Halpern et al. | Aug. 14, 1951 |